Patented May 23, 1933

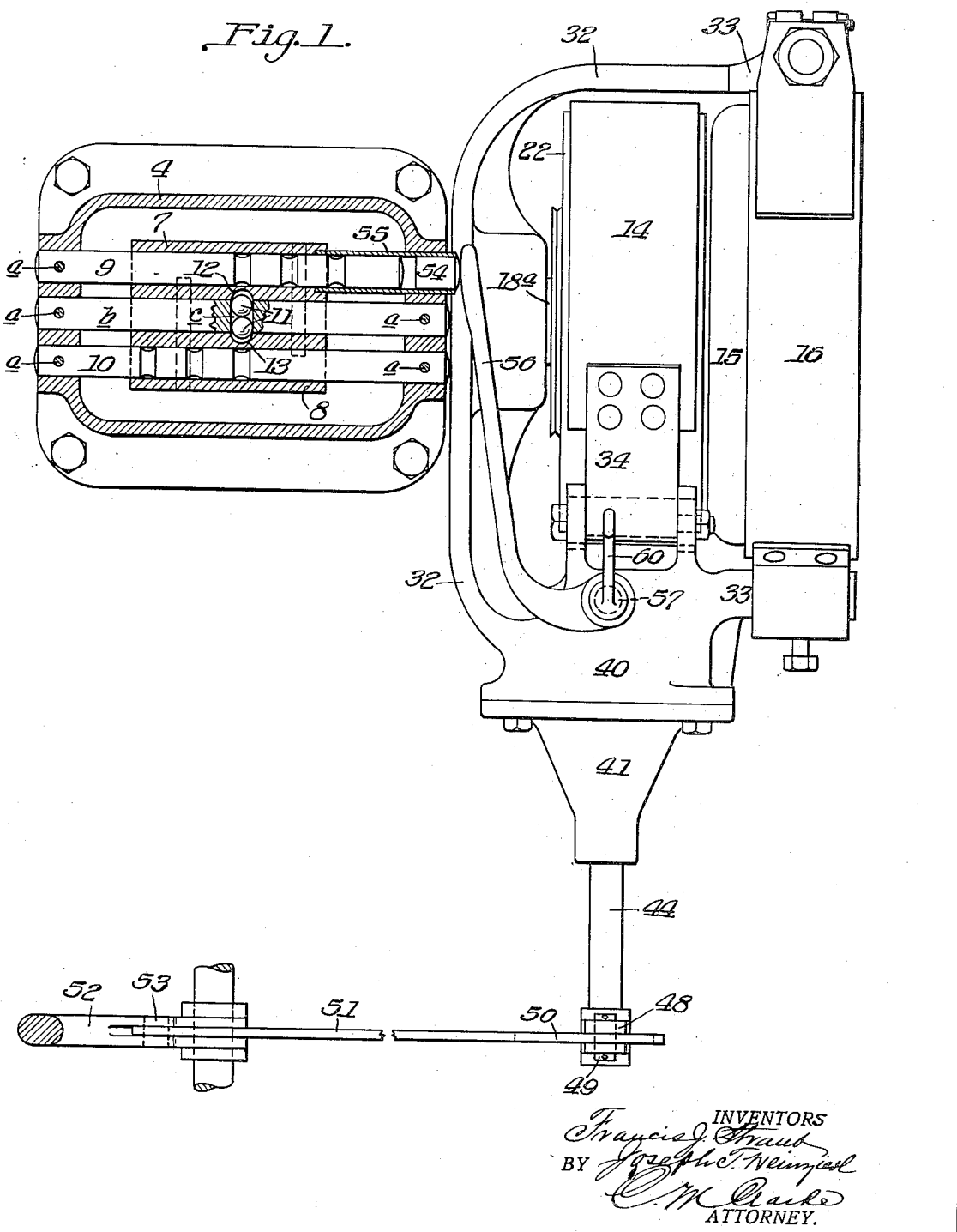

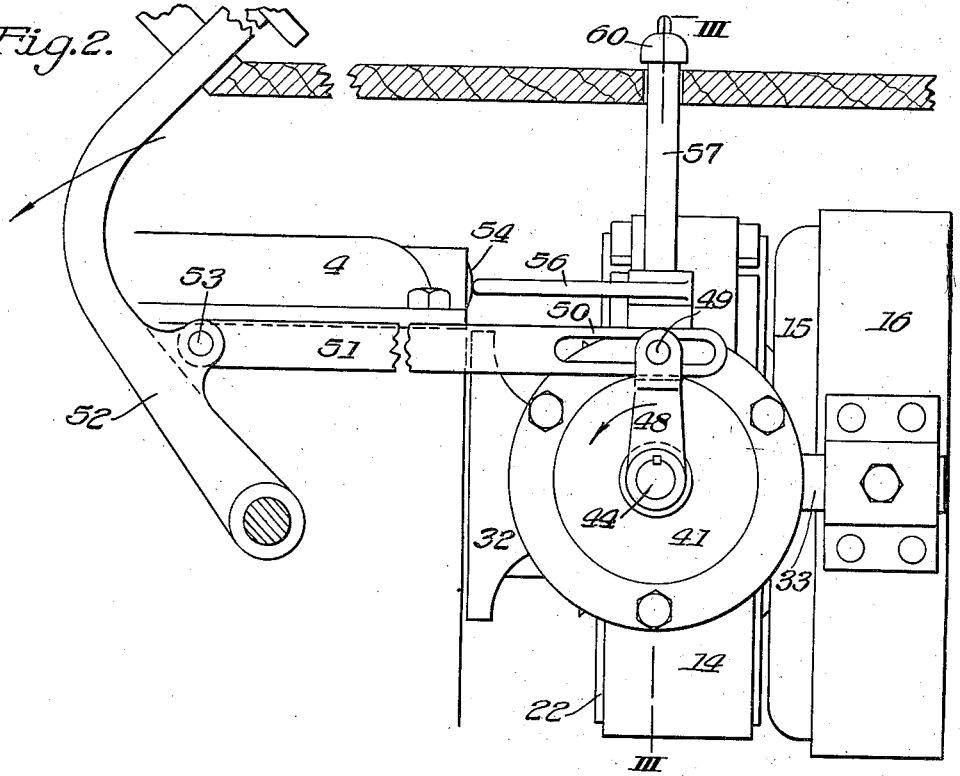
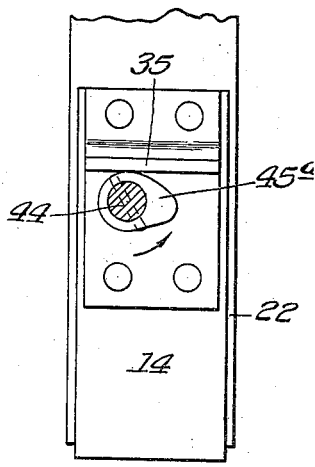
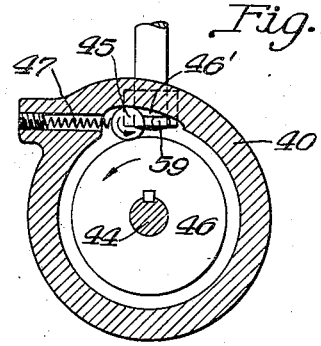

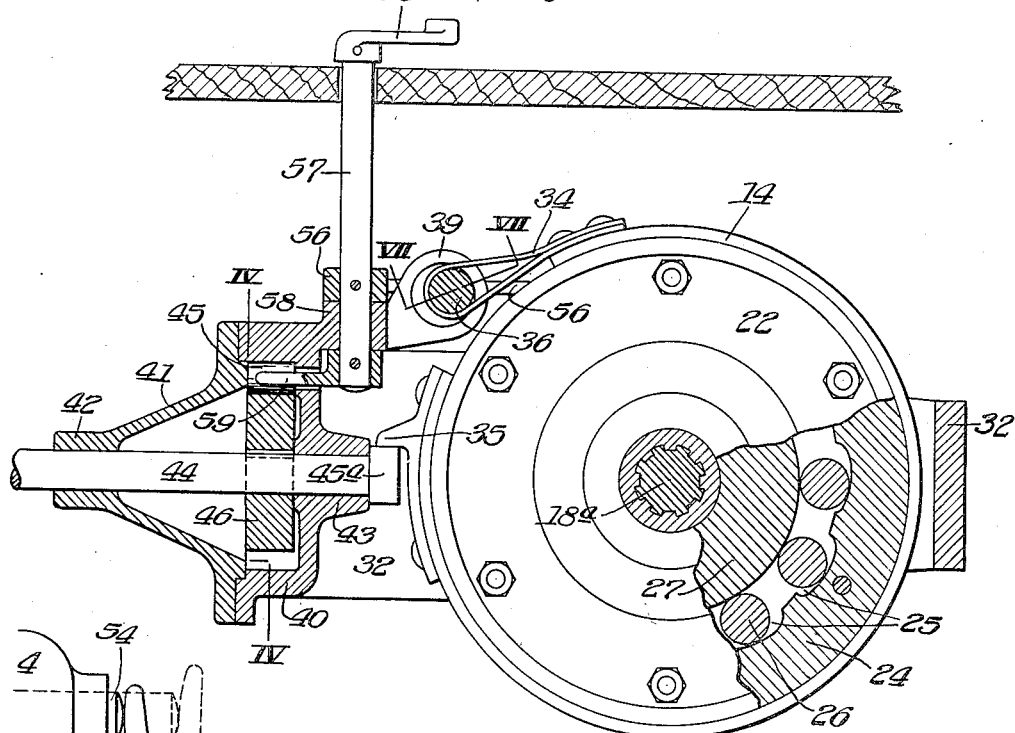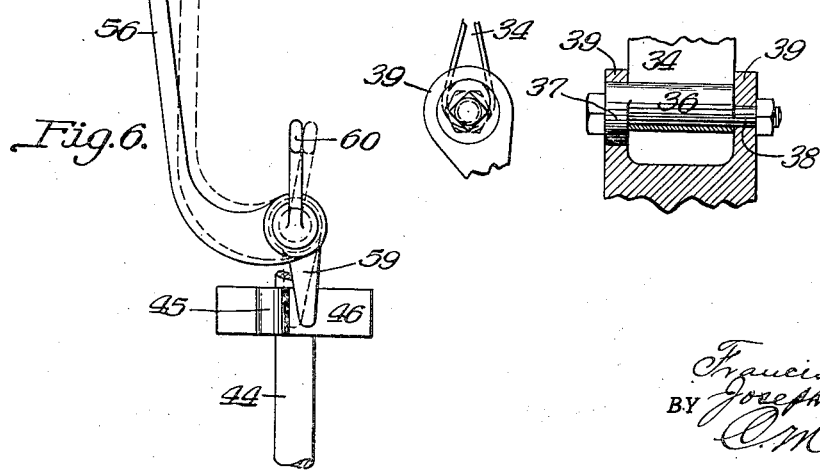

1,910,188

UNITED STATES PATENT OFFICE

FRANCIS J. STRAUB AND JOSEPH T. WEINZIERL, OF NEW KENSINGTON, PENNSYLVANIA

AUTOMOBILE DRIVE MECHANISM

Application filed July 23, 1931. Serial No. 552,589.

Our invention relates to an improvement in gear shifting mechanism for motor-driven vehicles, and has for its object to provide means for the prevention of undesirable back movements or travel of the vehicle under gravity.

Ordinarily, when such a vehicle as an automobile becomes stalled on a hill, or is being started up-grade from a stationary position, it is difficult to promptly shift the gears without, at the same time, utilizing the ordinary brake equipment, requiring considerable skill and experience for successfully obviating the gravity tendency and for smoothly imparting driving power from the engine to the gears.

Our invention contemplates the application to the usual or standard gear shift and secondary drive shaft, coupled with the engine through its clutch mechanism, of automatically operative interlocking means subject to the control of a supplemental brake operatively connected with and controlled by the gear shift mechanism, and manual control mechanism, to hold the car against reverse or back movement when the transmission is in either neutral, low, second, or high gear positions.

Ordinarily, when a motor vehicle is stopped on an upgrade, starting is made difficult by the necessity of releasing the brakes at the same time the engine picks up the load when the clutch is thrown in. Unless the driver is experienced and careful, an accident may occur if the vehicle gets beyond control and descends the grade backwardly.

The prevention device of this application permits free forward movement of the vehicle, but checks automatically any such backward movement. Likewise, in the case of an engine stalling in an attempt to start the vehicle, such undesired backward movement is prevented by the device engaging or becoming operative upon an initial backward movement.

By interlinking or connecting the controlling mechanism with the usual gear shifting lever, the device becomes automatically inoperative when it is desired to reverse the vehicle, and again operative when the gear shifting lever is in any other position than reverse.

The present invention is of the same general kind or class as that disclosed in our prior Patents Nos. 1,650,396, 1,749,962, and 1,798,504. In such prior constructions the brake band is adapted to grip the drum of an overrunning clutch by the pressure of a spring, and shifting the gears of the transmission into reverse position compresses the spring and causes the brake band to release the brake drum.

In our present invention we eliminate the spring from the brake band and connect it with the clutch pedal which controls the clutch between the engine and the transmission.

Means are also provided to lock the brake band in the gripping position, and unlocking means are provided, operable when the shift is made into reverse or when the manual release is operated. After the brake band is released by a shift into reverse or by manual release, disengagement of the engine clutch immediately tightens the brake band on the drum where it is locked until released again, either by a shift into reverse or by movement of the manual release lever.

In our present invention, shifting into reverse meets with but slight resistance, as very little pressure is required to operate the brake band unlocking means. Locking engagement between the brake band and the drum by disengaging the engine clutch ordinarily requires extra pressure on the pedal to effect tightening of the brake band, but such pressure is not excessive, because of the leverage. After the brake band has been tightened and locked, it remains locked and the clutch pedal operates in its normal manner until the brake band is again unlocked.

The present improvements are embodied in connection with the usual power equipment and mechanism, as illustrated in Patent 1,749,962.

In the drawings, showing one preferred construction:

Fig. 1 is a plan view, partly in horizontal section, showing the gear shifting mechanism in operative position with the brake band controlled interlocking mechanism;

Fig. 2 is a corresponding view thereof in side elevation, showing the slotted link connection with the clutch pedal;

Fig. 3 is a vertical section on the line III—III of Fig. 2, partly in elevation;

Fig. 4 is a cross section on the line IV—IV of Fig. 3, showing the locking roller controlling the brake band tightening cam in locking position;

Fig. 5 is a detail view showing the cam engagement with the brake band terminal;

Fig. 6 is a detail plan view showing the construction of the brake band adjusting and control mechanism;

Fig. 7 is a sectional detail view showing the eccentric bolt connection between the brake band and its retaining lugs, on the line VII—VII of Fig. 3;

Fig. 8 is a detail view of the same in side elevation.

As described in Patent 1,749,962, an extension of the usual standard gear shift lever projects downwardly between the shifting blocks or forks 7 and 8 and is adapted to actuate one or the other in the same general manner as therein described.

Blocks 7 and 8 are slidably mounted on rods 9 and 10 fixedly mounted in the casing 4, as by pins a.

An additional rod b is fixedly located between rods 9 and 10, similarly mounted in the casing, providing a slide mounting and guiding means for the blocks 7 and 8, each of which has a half-round side bearing thereon.

Rod b also provides for interlocking connection with one or the other of the shifting blocks 7 and 8 when one is shifted, to hold the other.

For such purpose, rod b is drilled across through its middle, providing a transverse socket c for a pair of interlocking balls 11 adapted to engage either socket 12 or 13 in block 7 or 8 so as to hold one of the blocks against movement when the other is shifted.

Thus, upon movement of either block, half-round socket 12 or 13 will ride over the adjacent ball 11, forcing it across against the other ball which then fills the opposite socket, locking its block against movement until the actuated block is again shifted back to registering or neutral position. In such neutral position, Fig. 1, the terminal of the shift lever is half-way between the blocks, each of which is provided with a recess of a depth sufficient to receive the full width of terminal when shifted to the right or left, as in standard practice.

By such construction the shifting of blocks 7 and 8 is accomplished in the usual order for low gear, reverse, second gear and high gear positions. The main purpose being to hold the car against backward movement on grades, we provide means for checking and holding the secondary drive shaft against gravity-induced reverse movement until the transmission is in low or other gear, moving forward, independent of reverse gear position. This is accomplished by means of the brake drum 22, normally gripped by a band 14 in all positions except positive reverse movement under power, through interlocking mechanism between the drum and shaft, to prevent such reversal under the conditions mentioned.

The gear shift or transmission mechanism above described is within the interior of the usual transmission case, beyond which extends the secondary shaft 18a, upon which is mounted the brake drum 22 and its co-operating mechanism for effecting the functions of the invention, as controlled by the gear shift and other associated manual control mechanism. The usual hand or emergency brake drum 15 is also secured to the shaft coupling for braking action by the surrounding brake band 16.

Brake drum 22 is provided with a middle cam ring 24 having an annular series of binding and releasing wedging wall sockets 25, for reception of a series of co-acting rollers 26.

Opposing said rollers, and providing an annular concentric bearing therefor, is a sleeve 27 connected with the driving shaft extension 18a. Such bushing forms the rotatable bearing against which rollers 26 are forced by the taper of the sockets 25 when the drum 22 is gripped by its band 14.

As thus arranged the drive shaft is free to rotate in the usual direction, but will be locked upon reverse movement when the drum is held, and when released, it is in floating condition, without locking action of the rollers. A U-shaped bracket 32 is mounted on the rear end of the main gear case below case 4 having side terminals 33 providing mounting supports for the holding brackets of emergency brake band 16, as in Fig. 1.

Brake band 14 is provided at one end with a looped anchoring terminal strap 34 and at the other end with a cam-engaging abutment 35. Looped terminal strap 34 engages around an eccentric stud 36 rotatably adjustable by concentric bolt terminals 37, 38, in lugs 39 extending inwardly from one end of bracket 32.

Bracket 32 is provided with a hollow extension 40 having a cap 41 secured thereto, providing bearings 42, 43, for a cam shaft 44 provided with the inner cam 45a engaging lug abutment 35.

A disk 46 is secured to shaft 44, the disk having edge contact with a roller 45 in a locking socket 46' of case 40. Such roller is normally pressed by a spring 47 so as to interlock with disk 46 in one direction of its movement and to release in the opposite direction. On the outer end of cam shaft 44 is an arm 48 having a pin 49 engaging slotted link terminal 50 of arm 51 connected with clutch pedal connecting rod 52 by pin 53.

When the clutch pedal is depressed arm 48 will move counter-clockwise, rotating shaft 44 and disk 46 and cam 45a, tightening brake band 14, roller 45 being spring pressed into engaging position with disk 46, ready to grip upon its reverse movement.

Therefore when the clutch pedal is released it will not impart movement to arm 48, due to slot 50, and disk 46 will remain locked, with cam 45a holding the brake band 14 tight around the drum.

When a shift is made into reverse gear by block 7, a plug 54 connected by sleeve 55 engages horizontal lever arm 56 and rotates its shaft 57 journalled in bearing 58 of casing 40.

Secured to the lower end of shaft 57 is a roller-unseating arm 59 extending through an opening of extension 40, so that when such shift of block 7 is made, the roller is pressed away from gripping engagement, unlocking the disk 46 and releasing cam 45a and the brake band 14, freeing the drum 22.

If it is desired to move the vehicle backwardly without operating the engine, as in a garage, the brake band may also be released independently. For such purpose shaft 57 is provided with a hand or foot lever 60 by which the same unlocking movement may be imparted to roller 45 and cam 45a as by arm 56, as in Fig. 6.

The construction and operation of the invention will be readily understood from the foregoing description.

Assuming brake band 14 to be normally released and the engine running, the first operation is to depress the clutch pedal in order to shift to low gear or reverse. In case of the former, the slotted link connection of the clutch lever with the lever arm 48 of cam shaft 44 causes the brake band to be tightened, and the non-reversing mechanism is immediately ready for use, with prevention of undesired backward motion, as on a hill.

It will be understood that the operation of the overrunning clutch is the same as in the prior patents mentioned, the improvement being in the positive closing of the brake band by the clutch pedal instead of by spring action. Also, in the releasing action on the brake band by disengaging the cam shaft locking mechanism, instead of forcing the brake band terminals apart against such spring pressure.

Because of such differences, the shift into reverse gear and operation of the manual release requires very little effort, while the pressure required on the clutch pedal to tighten the brake band is negligible.

What we claim is:

1. In automobile drive mechanism, the combination with a shaft-holding brake drum and a clamping band therefor having a tightening abutment, means engaging said abutment connected with a clutch lever and having a locking device, and means operable by gear shifting mechanism for releasing the locking mechanism.

2. In automobile drive mechanism, the combination with a shaft-holding brake drum and a clamping band therefor having a tightening abutment, means engaging said abutment connected with a clutch lever and having a locking device, and means having a manually operable element for releasing the locking mechanism.

3. In automobile drive mechanism, the combination with a shaft-holding brake drum and a clamping band therefor having a tightening abutment, means engaging said abutment connected with a clutch lever and having a locking device, and means operable by gear shifting mechanism for releasing the locking mechanism provided with a manually operable lever.

4. In automobile drive mechanism, the combination with a gear shifting member, a shaft-holding brake drum, and a clamping band therefor having a tightening abutment; of a cam engaging said abutment provided with a shaft and a holding disk, a movable locking roller therefor, and an arm actuated by the gear shifting member adapted to disengage the locking roller to release the band tightening cam.

5. In automobile drive mechanism, the combination with a gear shifting member, a shaft-holding brake drum, and a clamping band therefor having a tightening abutment; of a cam engaging said abutment provided with a shaft and a holding disk, a movable locking roller therefor, and a manually operated arm adapted to disengage the locking roller to release the band tightening cam.

6. In automobile drive mechanism, the combination with a gear shifting member, a shaft-holding brake drum, and a clamping band therefor having a tightening abutment; of a cam engaging said abutment provided with a shaft and a holding disk, a movable locking roller therefor, and an arm actuated by the gear shifting member adapted to disengage the locking roller to release the band tightening cam having a manually operable element for releasing the locking roller independently of the gear shifting member.

7. In automobile drive mechanism, the combination with a gear shifting member, a shaft-holding brake drum, and a clamping band therefor having a tightening abutment; of a cam engaging said abutment provided with a shaft and a holding disk, a spring pressed locking roller therefor, a shaft having an arm engageable by the gear shifting member, and a roller engaging finger adapted to disengage the locking roller.

8. In automobile drive mechanism, the combination with a gear shifting member, a shaft-holding brake drum, and a clamping band therefor having a tightening abutment; of a cam engaging said abutment provided with a shaft and a holding disk, a spring pressed locking roller therefor, a shaft having a roller engaging finger adapted to disengage the locking roller and a manually operable lever.

9. In automobile drive mechanism, the combination with a clutch lever, a gear shifting member, a shaft-holding brake drum, and a clamping band therefor having a tightening abutment; of a cam engaging said abutment provided with a shaft, a holding element, and a lever, a movable locking device therefor, a lost motion connection between the clutch lever and the cam shaft lever, and a member actuated by the gear shifting member adapted to disengage the locking device to release the band tightening cam.

10. In automobile drive mechanism, the combination with a shaft having a brake band tightening cam and means temporarily holding the shaft and cam in operative position, of a lever on the shaft having a pin, a clutch lever, a link on the clutch lever having slotted connection with the shaft lever pin, and means for releasing the cam shaft.

11. In automobile drive mechanism, the combination with a shaft having a brake band tightening cam and means temporarily holding the shaft and cam in operative position, of a lever on the shaft having a pin, a clutch lever, a link on the clutch lever having slotted connection with the shaft lever pin, and means for releasing the cam shaft operable upon gear shift movement.

12. In automobile drive mechanism, the combination with a shaft having a brake band tightening cam and means temporarily holding the shaft and cam in operative position, of a lever on the shaft having a pin, a clutch lever, a link on the clutch lever having slotted connection with the shaft lever pin, and means for releasing the cam shaft having an actuating arm adapted to be engaged by one of the movable members of associated gear shift mechanism.

13. In automobile drive mechanism, the combination with a shaft having a brake band tightening cam and means temporarily holding the shaft and cam in operative position, of a lever on the shaft having a pin, a clutch lever, a link on the clutch lever having slotted connection with the shaft lever pin, and means for releasing the cam shaft having a manually operable arm.

In testimony whereof we hereunto affix our signatures.

FRANCIS J. STRAUB.
JOSEPH T. WEINZIERL.